US012671028B2

(12) United States Patent
Taira et al.

(10) Patent No.: US 12,671,028 B2
(45) Date of Patent: Jun. 30, 2026

(54) DEVICE FOR MANUFACTURING PERMANENT MAGNET

(71) Applicant: Resonac Corporation, Tokyo (JP)

(72) Inventors: Arisa Taira, Tokyo (JP); Kazumasa Takeuchi, Tokyo (JP); Teruo Itoh, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 0 days.

(21) Appl. No.: 18/864,809

(22) PCT Filed: Aug. 14, 2023

(86) PCT No.: PCT/JP2023/029467
§ 371 (c)(1),
(2) Date: Nov. 11, 2024

(87) PCT Pub. No.: WO2024/127713
PCT Pub. Date: Jun. 20, 2024

(65) Prior Publication Data

US 2025/0299877 A1 Sep. 25, 2025

(30) Foreign Application Priority Data

Dec. 14, 2022 (JP) ................................ 2022-199438

(51) Int. Cl.
*B22F 3/03* (2006.01)
*H01F 41/02* (2006.01)

(52) U.S. Cl.
CPC ............ *H01F 41/0266* (2013.01); *B22F 3/03* (2013.01); *H01F 41/0273* (2013.01)

(58) Field of Classification Search
None
See application file for complete search history.

(56) References Cited

U.S. PATENT DOCUMENTS

2006/0022782 A1* 2/2006 Sato ........................ H01F 7/021 335/302

FOREIGN PATENT DOCUMENTS

JP H6-079134 A 11/1994
JP H08111337 A * 4/1996 ........... H01F 41/028
(Continued)

OTHER PUBLICATIONS

Machine translation of JPH08-111337A. (Year: 1996).*

*Primary Examiner* — Xiaowei Su
(74) *Attorney, Agent, or Firm* — FITCH, EVEN, TABIN & FLANNERY, LLP

(57) ABSTRACT

A permanent magnet manufacturing apparatus includes a compression molding mechanism and a magnetic field generating mechanism. The compression molding mechanism includes a pair of punches facing each other, and a die having a tubular shape into which the pair of punches are inserted. The magnetic field generating mechanism includes a pair of coils. The compression molding mechanism is disposed between the pair of coils. A raw material containing magnet powder is supplied into the die. The raw material in the die is compressed by the pair of punches while a magnetic field generated by at least one of the coils is applied to the raw material. A direction of the magnetic field applied to the raw material is changed by at least one operation selected from a group consisting of a movement of an entirety of the magnetic field generating mechanism, a rotation of the entirety of the magnetic field generating mechanism, and a rotation of at least one of the coils.

2 Claims, 16 Drawing Sheets

(56) References Cited

FOREIGN PATENT DOCUMENTS

| | | | |
|---|---|---|---|
| JP | H10-193189 | A | 7/1998 |
| JP | 2004-072818 | A | 3/2004 |
| JP | 2008-205498 | A | 9/2008 |
| JP | 2010-258181 | A | 11/2010 |
| JP | 2012-190937 | A | 10/2012 |
| WO | 2006/064589 | A1 | 6/2006 |
| WO | 2009/081978 | A1 | 7/2009 |

* cited by examiner

DEVICE FOR MANUFACTURING PERMANENT MAGNET

CROSS-REFERENCE TO RELATED APPLICATIONS

This application is a U.S. national phase application filed under 35 U.S.C. § 371 of International Application No. PCT/JP2023/029467, filed Aug. 14, 2023, designating the United States, which claims priority from Japanese Application No. 2022-199438, filed Dec. 14, 2022, which are incorporated herein by reference in their entireties.

TECHNICAL FIELD

The present disclosure relates to a permanent magnet manufacturing apparatus.

BACKGROUND ART

In the manufacture of anisotropic permanent magnets such as a bonded magnet and a sintered magnet, a raw material containing magnet powder (a large number of magnetic particles made of permanent magnet) is supplied into a die. A compact is formed from the raw material by compressing the raw material using the die while applying a magnetic field, which is generated by a coil, to the raw material in the die. Each magnetic particle (magnetic domain in each magnetic particle) in the compact is magnetized and oriented along the magnetic field (refer to Patent Literatures 1 and 2 below). For example, in a typical permanent magnet manufacturing method, a die is disposed such that a portion of a magnetic field having a high density of magnetic flux (magnetic lines of force) passes through a raw material in the die, and the magnetic field parallel to or perpendicular to a pressing direction (compression direction) of the raw material is applied to the raw material in the die. As a result, the easy magnetization axis (crystallographic axis) of each magnetic particle (or each magnetic domain) in a permanent magnet is magnetized and oriented parallel to the magnetic field.

A Nd—Fe—B-based magnet that is a type of permanent magnet is used as the raw material for both a bonded magnet and a sintered magnet. Meanwhile, since the crystal structure of a Sm—Fe—N-based magnet is likely to deteriorate at high temperature (approximately 500° C.), it is difficult to manufacture a sintered magnet from the Sm—Fe—N-based magnet. Therefore, the Sm—Fe—N-based magnet is used as the raw material for a bonded magnet that can be manufactured by heating (thermal curing of a thermosetting resin mixed with magnet powder) at low temperature at which the crystal structure is maintained. The Sm—Fe—N-based magnet can be manufactured from an inexpensive raw material compared to the Nd—Fe—B-based magnet, and has excellent magnetic characteristics.

CITATION LIST

Patent Literature

Patent Literature 1: Japanese Unexamined Patent Publication No. H10-193189

Patent Literature 2: Japanese Unexamined Utility Model Publication No. H6-79134

SUMMARY OF INVENTION

Technical Problem

Permanent magnets are used in various technical fields as components constituting motors or actuators. For example, permanent magnets are used in various industrial products such as electric vehicles, hybrid vehicles, smartphones, magnetic resonance imaging (MRI) apparatuses, digital cameras, flat-screen televisions, hard disk drives, scanners, air conditioners, heat pumps, refrigerators, vacuum cleaners, washing and drying machines, elevators, and wind power generators. Depending on these various applications, the dimensions, shape, and magnetization direction required for the permanent magnets differ. Therefore, in order to manufacture a wide variety of permanent magnets, it is desirable that the magnetization direction of the permanent magnet can be easily changed depending on the application, dimensions, and shape of the permanent magnet. In order to easily change the magnetization direction of the permanent magnet, it is desirable that the direction and the intensity of a magnetic field applied to a raw material in a die can be easily controlled. Particularly, as the size of the permanent magnet decreases, it becomes necessary to accurately change and control the direction and the intensity of a magnetic field in a narrow region (a region where a small die containing a raw material is installed). For example, magnet powder in the raw material may be oriented along magnetic lines of force having a predetermined curvature. In other words, each magnetic domain in the permanent magnet may be oriented along a curve having a predetermined curvature. In a state where the angle between a pressing direction of the raw material and the magnetic lines of force is maintained at any value, the magnet powder in the raw material may be oriented along the magnetic lines of force. In other words, the angle between the pressing direction of the raw material and an orientation direction of the magnet powder in the raw material may be adjusted to any value. The magnetic field may be controlled such that a portion of the magnetic field having a relatively low density of magnetic flux is applied to the raw material in the die.

However, in a conventional permanent magnet manufacturing apparatus, the movable range of a die is limited, and the position and the direction of coils are fixed. Therefore, in the conventional permanent magnet manufacturing apparatus, it has been difficult to freely change the direction of a magnetic field that the coils apply to a raw material in the die. Namely, it has been difficult to freely change the magnetization direction of a permanent magnet using the conventional permanent magnet manufacturing apparatus.

An object of one aspect of the present invention is to provide a permanent magnet manufacturing apparatus capable of easily changing the magnetization direction of a permanent magnet.

Solution to Problem

For example, one aspect of the present invention relates to a permanent magnet manufacturing apparatus according to any one of [1] to [5] below.

[1] A permanent magnet manufacturing apparatus includes a compression molding mechanism; and a magnetic field generating mechanism. The compression molding mechanism includes a pair of punches facing each other, and a die having a tubular shape into which the pair of punches are inserted. The magnetic field generating mechanism includes a pair of coils. The compression molding mechanism is disposed between the pair of coils. The compression molding mechanism does not penetrate through an inside of each of the pair of coils. A raw material containing magnet powder is supplied into the die. A magnetic field is generated by at least one of the pair of coils. A compact is formed from the raw material by compressing the raw material in the die using the pair of punches while applying the magnetic field to the raw material in the die. A direction of the magnetic field applied to the raw material in the die is changed by at least one operation selected from a group consisting of a movement of an entirety of the magnetic field generating mechanism, a rotation of the entirety of the magnetic field generating mechanism, and a rotation of at least one of the coils.

[2] A permanent magnet manufacturing apparatus includes a compression molding mechanism; and a magnetic field generating mechanism. The compression molding mechanism includes a pair of punches facing each other, and a die having a tubular shape into which the pair of punches are inserted. The magnetic field generating mechanism includes a pair of coils. At least a part of the compression molding mechanism is disposed inside each of the pair of coils. A raw material containing magnet powder is supplied into the die. A magnetic field is generated by at least one of the pair of coils. A compact is formed from the raw material by compressing the raw material in the die using the pair of punches while applying the magnetic field to the raw material in the die. A direction of the magnetic field applied to the raw material in the die is changed by at least one operation selected from a group consisting of a movement of an entirety of the magnetic field generating mechanism, a rotation of the entirety of the magnetic field generating mechanism, and a rotation of at least one of the coils.

[3] In the permanent magnet manufacturing apparatus according to [1] or [2], a pressing direction is defined as a direction in which the pair of punches face each other, and the entirety of the magnetic field generating mechanism moves in at least one of a direction parallel to the pressing direction and a direction perpendicular to the pressing direction.

[4] In the permanent magnet manufacturing apparatus according to any one of [1] to [3], a pressing direction is defined as a direction in which the pair of punches face each other, a distance from a rotation axis of the entirety of the magnetic field generating mechanism to one coil is equal to a distance from the rotation axis to the other coil, the rotation axis is perpendicular to the pressing direction, and the entirety of the magnetic field generating mechanism rotates about the rotation axis.

[5] In the permanent magnet manufacturing apparatus according to any one of [1] to [4], a pressing direction is defined as a direction in which the pair of punches face each other, and at least one of the coils rotates such that an angle between a central axis of the one coil and the pressing direction is changed.

Advantageous Effects of Invention

According to one aspect of the present invention, there is provided the permanent magnet manufacturing apparatus capable of easily changing the magnetization direction of a permanent magnet.

DESCRIPTION OF EMBODIMENTS

Figure 1:
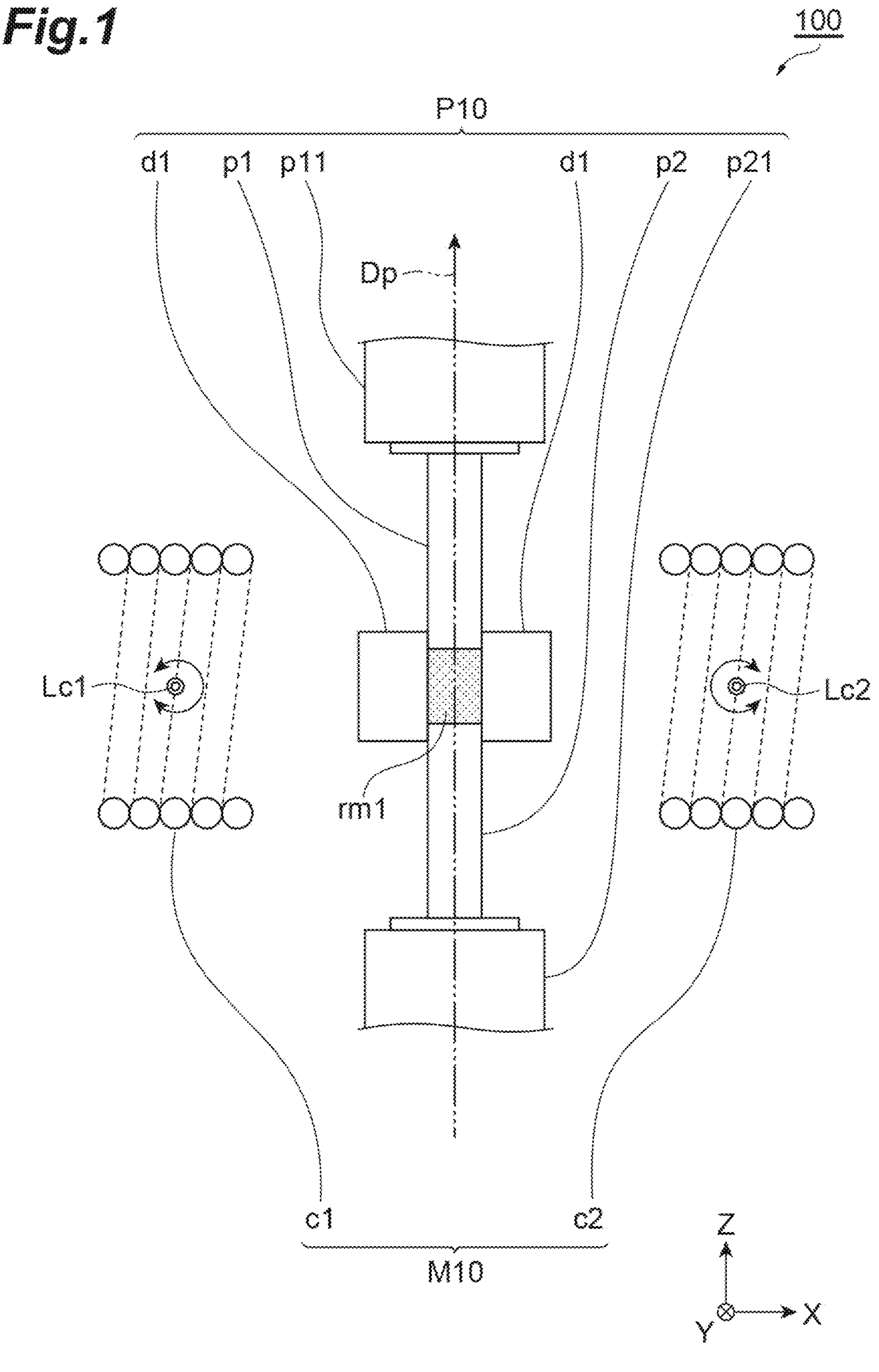
FIG. 1 is a schematic cross-sectional view of a manufacturing apparatus according to a first embodiment of the present invention, and a cross section shown in FIG. 1 is parallel to a pressing direction, and traverses all of a pair of punches, a die, and a pair of coils.

Hereinafter, an exemplary embodiment of the present invention will be described with reference to the drawings. In the drawings, equivalent reference signs are assigned to equivalent components. The present invention is not limited to the following embodiments. X, Y, and Z shown in FIGS. 1 to 16 refer to three coordinate axes orthogonal to each other. Each of X-axis, Y-axis and Z-axis directions is common to FIGS. 1 to 16. The term “permanent magnet” described below refers to at least one of anisotropic magnets including a bonded magnet and a sintered magnet.

First Embodiment

Figure 2:
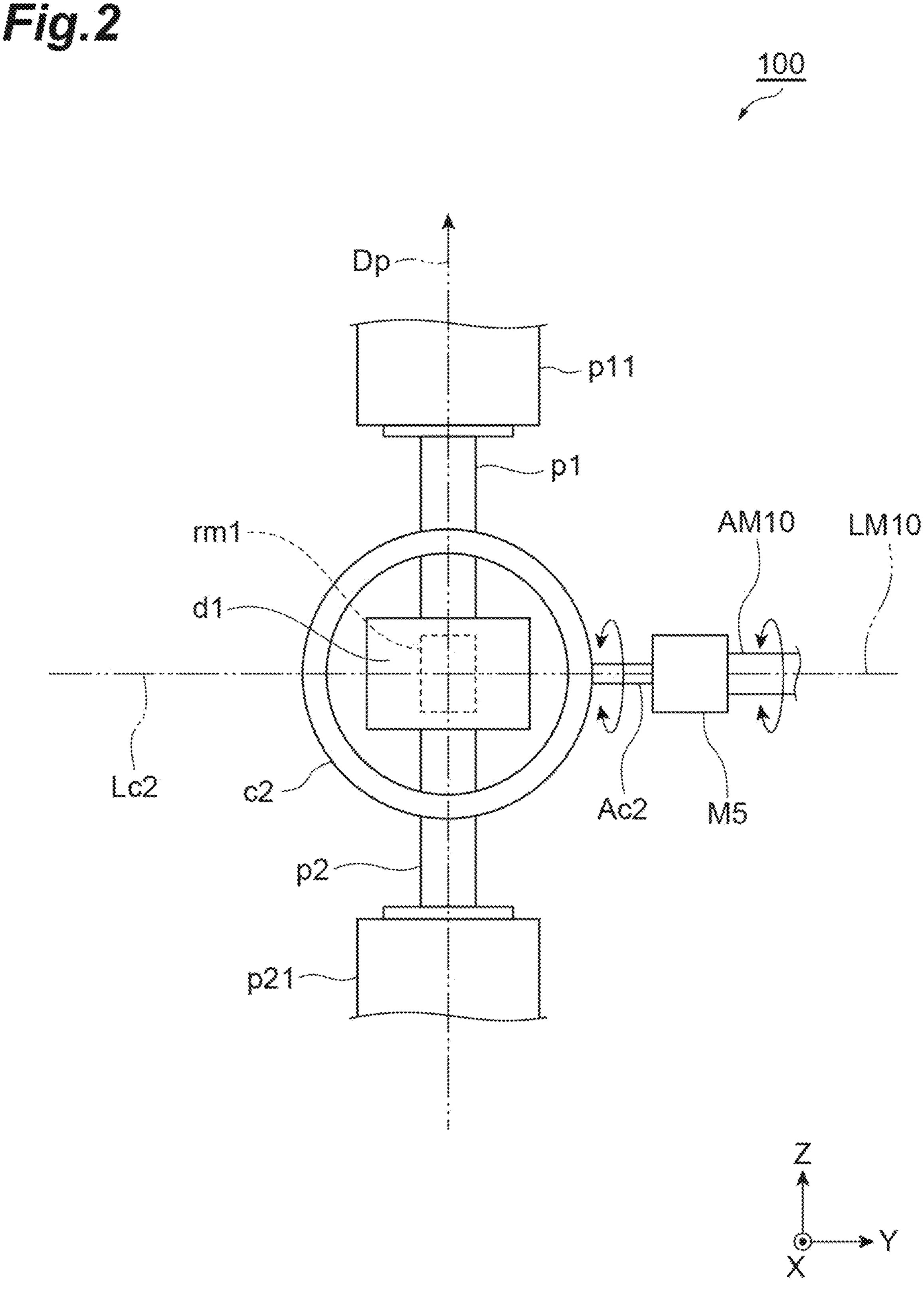
FIG. 2 is a schematic side view of the manufacturing apparatus shown in FIG. 1.
Figure 3:
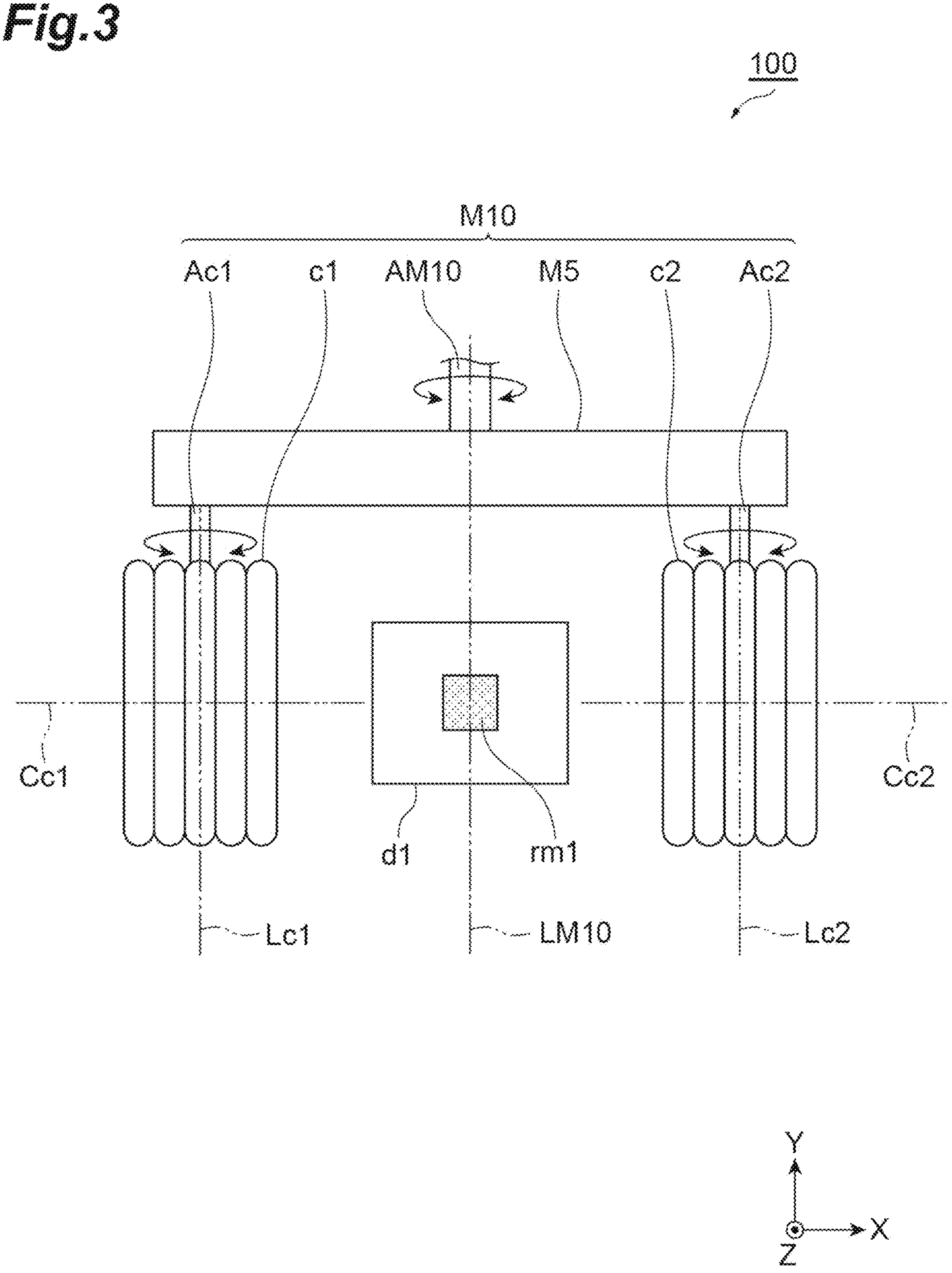
FIG. 3 is a schematic top view of the manufacturing apparatus shown in FIG. 1, and portions of a compression molding mechanism other than the die are omitted in FIG. 3.

FIGS. 1 to 11 show a permanent magnet manufacturing apparatus 100 according to a first embodiment of the present invention. FIG. 1 shows a cross section of the manufacturing apparatus 100. The cross section shown in FIG. 1 is parallel to the front of the manufacturing apparatus 100. FIG. 2 shows the side of the manufacturing apparatus 100 shown in FIG. 1. FIG. 3 shows the top of the manufacturing apparatus 100 shown in FIG. 1. FIGS. 4 to 11 each show the front of the manufacturing apparatus 100. For convenience of description, in FIGS. 4 to 11 (each front view), a cross section of a raw material rm1 containing magnet powder and a cross section of a die d1 having a tubular shape are shown.

[Outline of Manufacturing Apparatus 100]

The permanent magnet manufacturing apparatus 100 includes a compression molding mechanism P10 and a magnetic field generating mechanism M10.

The compression molding mechanism P10 includes a pair of punches (a first punch p1 and a second punch p2) facing each other, and the die d1 having a tubular shape into which the pair of punches are inserted. A first opening is formed on an end face of the die d1 facing the first punch p1, and the first punch p1 is inserted into the first opening. A second opening is formed on an end face of the die d1 facing the second punch p2, and the second punch p2 is inserted into the second opening. A cavity (recessed mold) may be formed by the second punch p2 inserted into the die d1 and the die d1. The first punch p1 may function as a core (protruding mold).

The compression molding mechanism P10 further includes a first pressing mechanism p11 and a second pressing mechanism p21. For example, each of the first pressing mechanism p11 and the second pressing mechanism p21 may be a hydraulic system. The first punch p1 is connected to the first pressing mechanism p11, and is freely driven by the first pressing mechanism p11. The second punch p2 is connected to the second pressing mechanism p21, and is freely driven by the second pressing mechanism p21. The die d1, the first pressing mechanism p11, and the second pressing mechanism p21 may be fixed in the manufacturing apparatus 100.

The raw material rm1 containing magnet powder is supplied into the die d1. The raw material rm1 in the die d1 is sandwiched between the first punch p1 and the second punch p2, and is pressed by the first punch p1 and the second punch p2. The magnetic powder may be rephrased as a large number of magnetic particles made of permanent magnet.

The dimensions and shape of each of the first punch p1, the second punch p2, and the die d1 are not limited. For example, the dimensions and shape of each of the first punch p1, the second punch p2, and the die d1 may be changed depending on the desired dimensions and shape of a compact (or permanent magnet). The composition of each of the first punch p1, the second punch p2, and the die d1 is not limited. For example, each of the first punch p1, the second punch p2, and the die d1 may be made of metal having sufficient mechanical strength as a mold.

A pressing direction Dp (compression direction) is defined as a direction in which the pair of punches (the first punch p1 and the second punch p2) face each other. The pressing direction Dp (compression direction) may be rephrased as a direction in which end faces of the pair of punches face each other, or a direction perpendicular to the end faces of the pair of punches.

The magnetic field generating mechanism M10 includes a pair of coils (a first coil c1 and a second coil c2). The compression molding mechanism P10 is disposed between the pair of coils (the first coil c1 and the second coil c2). The compression molding mechanism P10 does not penetrate through the inside of each of the pair of coils (the first coil c1 and the second coil c2).

The manufacturing apparatus 100 further includes an electric power supply mechanism. Each of the first coil c1 and the second coil c2 is electrically connected to the electric power supply mechanism. The electric power supply mechanism freely controls each of the direction and the absolute value of a first current Ic1 generated in the first coil c1 and the direction and the absolute value of a second current Ic2 generated in the second coil c2. The electric power supply mechanism is omitted in each figure.

As long as each of the first coil c1 and the second coil c2 is a conductor, the composition of each of the first coil c1 and the second coil c2 is not limited. Each of the first coil c1 and the second coil c2 may be an air core coil. An iron core (yoke) may be installed inside each of the first coil c1 and the second coil c2. The inner diameter and the number of windings (the number of turns) of each of the first coil c1 and the second coil c2 are not limited. The inner diameters of the first coil c1 and the second coil c2 may be the same as each other. The inner diameters of the first coil c1 and the second coil c2 may be different from each other. The numbers of windings of the first coil c1 and the second coil c2 may be the same as each other. The numbers of windings of the first coil c1 and the second coil c2 may be different from each other.

The magnetic field generating mechanism M10 further includes a first rotation mechanism Ac1, a second rotation mechanism Ac2, a coupling member M5, and a third rotation mechanism AM10, in addition to the pair of coils (the first coil c1 and the second coil c2). The first coil c1 is installed in the vicinity of one end of the coupling member M5 via the first rotation mechanism Ac1. The second coil c2 is installed in the vicinity of the other end of the coupling member M5 via the second rotation mechanism Ac2. The manufacturing apparatus 100 further includes a movement mechanism. The coupling member M5 is connected to the movement mechanism via the third rotation mechanism AM10. The movement mechanism is omitted in each figure.

[Movement of Entirety of Magnetic Field Generating Mechanism M10]

The entirety of the magnetic field generating mechanism M10 is freely rotated in at least one of a direction parallel to the pressing direction Dp and a direction perpendicular to the pressing direction Dp by the movement mechanism to which the coupling member M5 is connected. In other words, the position of the magnetic field generating mechanism M10 is adjusted to a desired position by the movement mechanism, and is fixed. The entirety of the magnetic field generating mechanism M10 may be freely moved in both the direction parallel to the pressing direction Dp and the direction perpendicular to the pressing direction Dp by the movement mechanism. However, the range where the entirety of the magnetic field generating mechanism M10 moves is limited to a range where the magnetic field generating mechanism M10 does not physically interfere with the compression molding mechanism P10. The direction parallel to the pressing direction Dp may be rephrased as the Z-axis direction. The direction perpendicular to the pressing direction Dp may be rephrased as a direction parallel to an X-Y plane.

Figure 4:
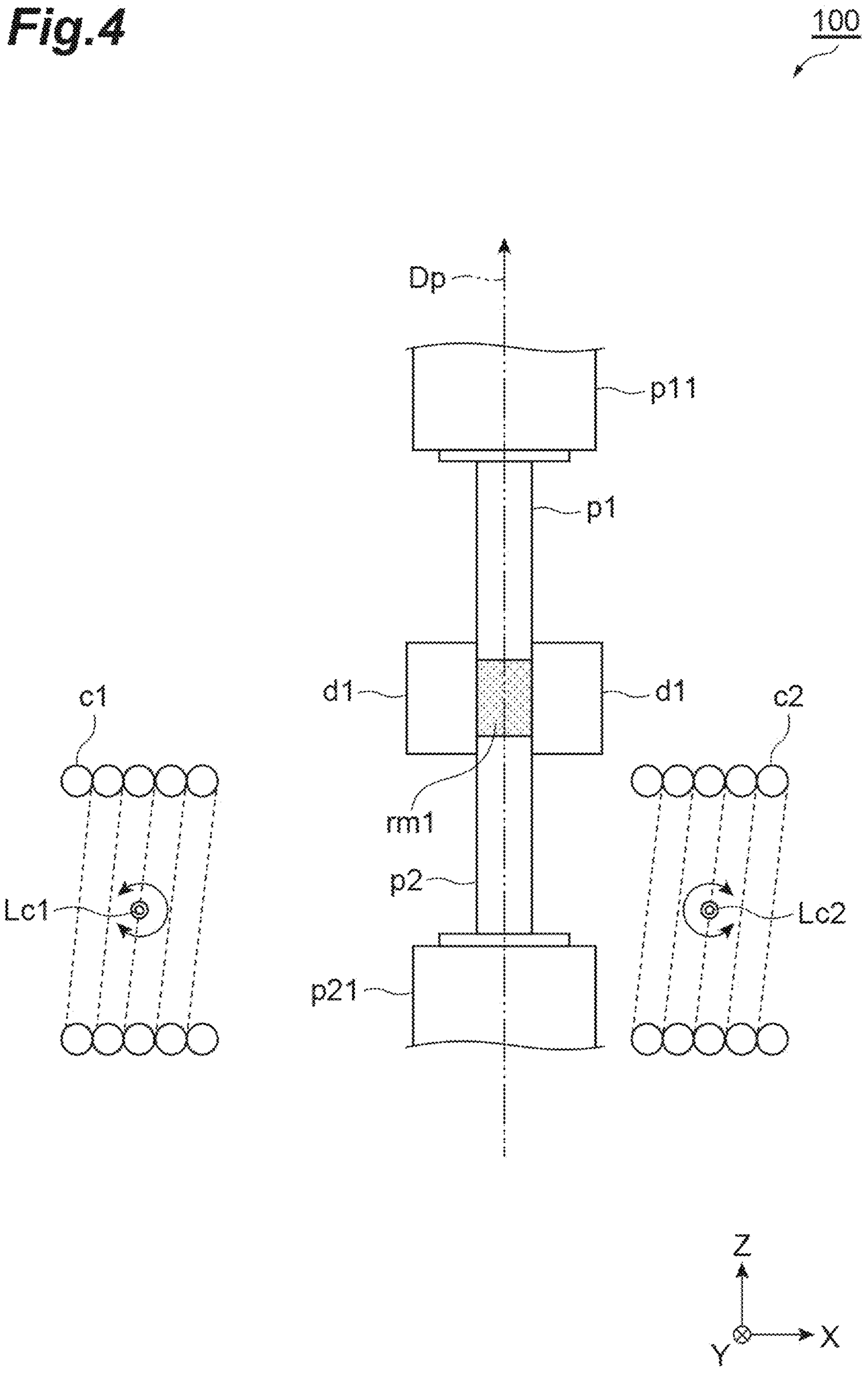
FIG. 4 shows a state where the entirety of a magnetic field generating mechanism in the manufacturing apparatus shown in FIG. 1 is moved.

FIG. 1 shows the disposition of each of the first coil c1 and the second coil c2 before the entirety of the magnetic field generating mechanism M10 moves. FIG. 4 shows one example of the disposition of each of the first coil c1 and the second coil c2 after the entirety of the magnetic field generating mechanism M10 is moved in both the direction parallel to the pressing direction Dp and the direction perpendicular to the pressing direction Dp.

As long as the movement mechanism has the function of moving the entirety of the magnetic field generating mechanism M10 in at least one of the direction parallel to the pressing direction Dp and the direction perpendicular to the pressing direction Dp, the specific structure of the movement mechanism is not limited. For example, the movement mechanism may include a first actuator (linear actuator) that moves the magnetic field generating mechanism M10 (coupling member M5) in the direction parallel to the pressing direction Dp. The movement mechanism may include a second actuator (linear actuator) that moves the magnetic field generating mechanism M10 (coupling member M5) in the direction parallel to the pressing direction Dp. The movement mechanism may be a multi-axis actuator that moves the magnetic field generating mechanism M10 in both the direction parallel to the pressing direction Dp and the direction perpendicular to the pressing direction Dp. For example, the multi-axis actuator may include the first actuator and the second actuator. For example, the magnetic field generating mechanism M10 (coupling member M5) may be directly driven by the first actuator, and the entirety of the magnetic field generating mechanism M10 (coupling member M5) and the first actuator may be driven by the second actuator. The magnetic field generating mechanism M10 (coupling member M5) may be directly driven by the second actuator, and the entirety of the magnetic field generating mechanism M10 (coupling member M5) and the second actuator may be driven by the first actuator. For example, each of the actuators described above may be an electric actuator or a hydraulic actuator.

[Rotation of Entirety of Magnetic Field Generating Mechanism M10]

The entirety of the magnetic field generating mechanism M10 about a third rotation axis LM10 is freely rotated by the third rotation mechanism AM10 coupled to the coupling member M5. After the rotation of the magnetic field generating mechanism M10, the direction (inclination) of the entirety of the magnetic field generating mechanism M10 is fixed. The third rotation mechanism AM10 and the third rotation axis LM10 are shown in FIGS. 2 and 3. For example, the third rotation mechanism AM10 may include a rotating shaft coupled to the magnetic field generating mechanism M10 (coupling member M5); a bearing to which the rotating shaft is connected; and a motor that drives the rotating shaft. The rotation axis (third rotation axis LM10) of the entirety of the magnetic field generating mechanism M10 is perpendicular to the pressing direction Dp. The range where the entirety of the magnetic field generating mechanism M10 rotates is limited to a range where the magnetic field generating mechanism M10 does not physically interfere with the compression molding mechanism P10.

A distance from the rotation axis (third rotation axis LM10) of the entirety of the magnetic field generating mechanism M10 to one coil (first coil c1) is equal to a distance from the third rotation axis LM10 to the other coil (second coil c2). For example, a distance from the rotation axis (third rotation axis LM10) of the entirety of the magnetic field generating mechanism M10 to a first rotation axis Lc1 of the first coil c1 may be equal to a distance from the third rotation axis LM10 to a second rotation axis Lc2 of the second coil c2. For example, a distance from the rotation axis (third rotation axis LM10) of the entirety of the magnetic field generating mechanism M10 to the center of gravity of the first coil c1 may be equal to a distance from the third rotation axis LM10 to the center of gravity of the second coil c2.

Figure 5:
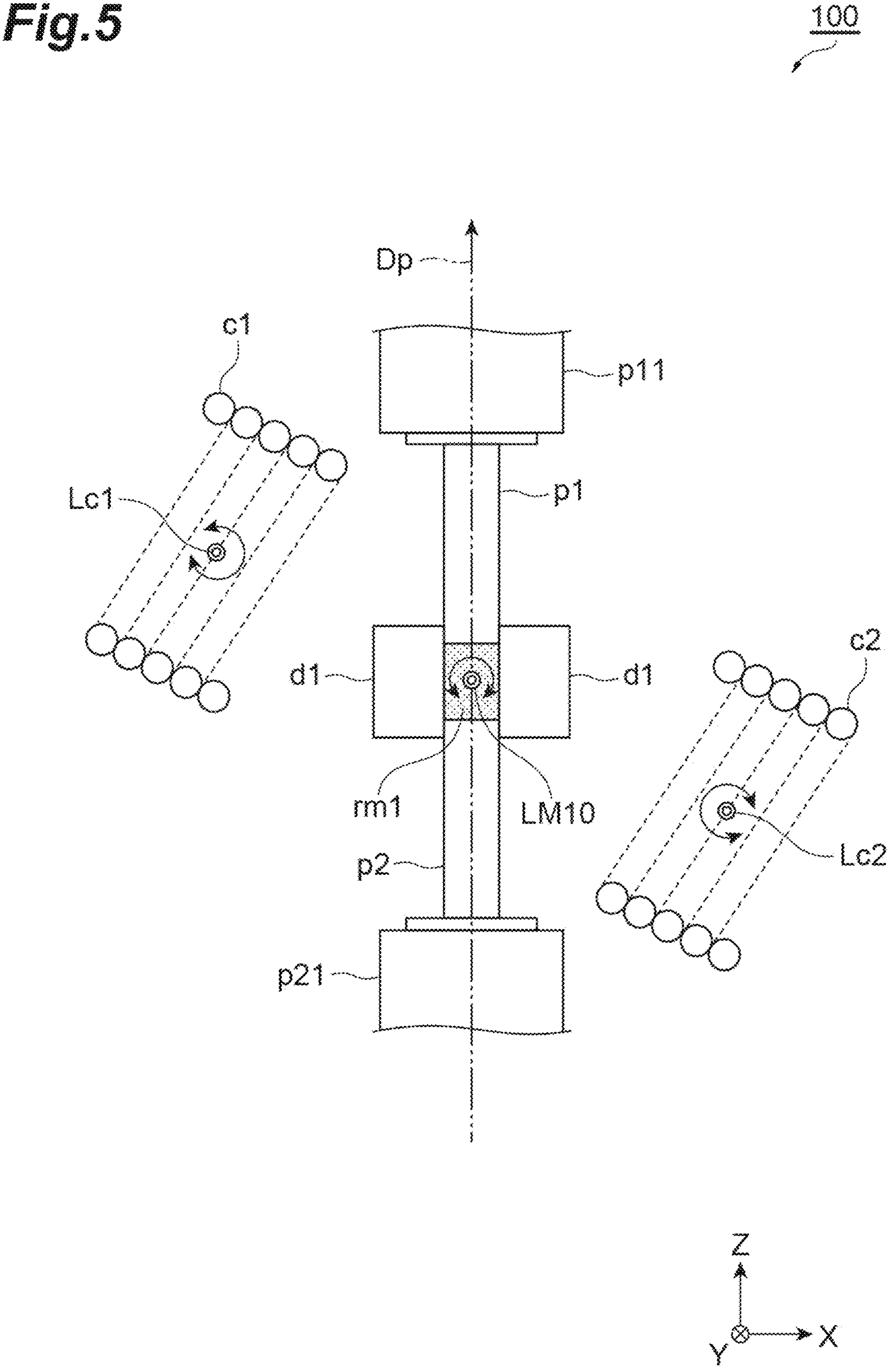
FIG. 5 shows a state where the entirety of the magnetic field generating mechanism in the manufacturing apparatus shown in FIG. 1 is rotated.

FIG. 1 shows the disposition of each of the first coil c1 and the second coil c2 before the entirety of the magnetic field generating mechanism M10 rotates. FIG. 5 shows one example of the disposition of each of the first coil c1 and the second coil c2 after the entirety of the magnetic field generating mechanism M10 is rotated.

[Rotation of Coil]

At least one coil rotates such that the angle between a central axis of the one coil and the pressing direction Dp changes. Namely, by rotating at least one coil, the angle between the central axis of the one coil and the pressing direction Dp is adjusted to a desired value. Only one of the pair of coils (the first coil c1 and the second coil c2) may rotate. Each of the pair of coils (the first coil c1 and the second coil c2) may rotate independently.

For example, the first coil c1 is freely rotated about the first rotation axis Lc1 by the first rotation mechanism Ac1. An angle θ between a central axis (first central axis Cc1) of the first coil c1 and the pressing direction Dp is freely changed by the rotation of the first coil c1. After the rotation of the first coil c1, the direction (inclination) of the first coil c1 is fixed. The range where the first coil c1 rotates is limited to a range where the first coil c1 does not physically interfere with the compression molding mechanism P10. The rotation axis (first rotation axis Lc1) of the first coil c1 is perpendicular to the pressing direction Dp, and is parallel to the rotation axis (third rotation axis LM10) of the entirety of the magnetic field generating mechanism M10. The first rotation mechanism Ac1 may include a rotating shaft coupled to the first coil c1; a bearing to which the rotating shaft is connected; and a motor that drives the rotating shaft.

For example, the second coil c2 is freely rotated about the second rotation axis Lc2 by the second rotation mechanism Ac2. An angle between the central axis (second central axis Cc2) of the second coil c2 and the pressing direction Dp is freely changed by the rotation of the second coil c2. After the rotation of the second coil c2, the direction (inclination) of the second coil c2 is fixed. The range where the second coil c2 rotates is limited to a range where the second coil c2 does not physically interfere with the compression molding mechanism P10. The rotation axis (second rotation axis Lc2) of the second coil c2 is perpendicular to the pressing direction Dp, and is parallel to the rotation axis (third rotation axis LM10) of the entirety of the magnetic field generating mechanism M10. The second rotation mechanism Ac2 may include a rotating shaft coupled to the second coil c2; a bearing to which the rotating shaft is connected; and a motor that drives the rotating shaft.

Figure 6:
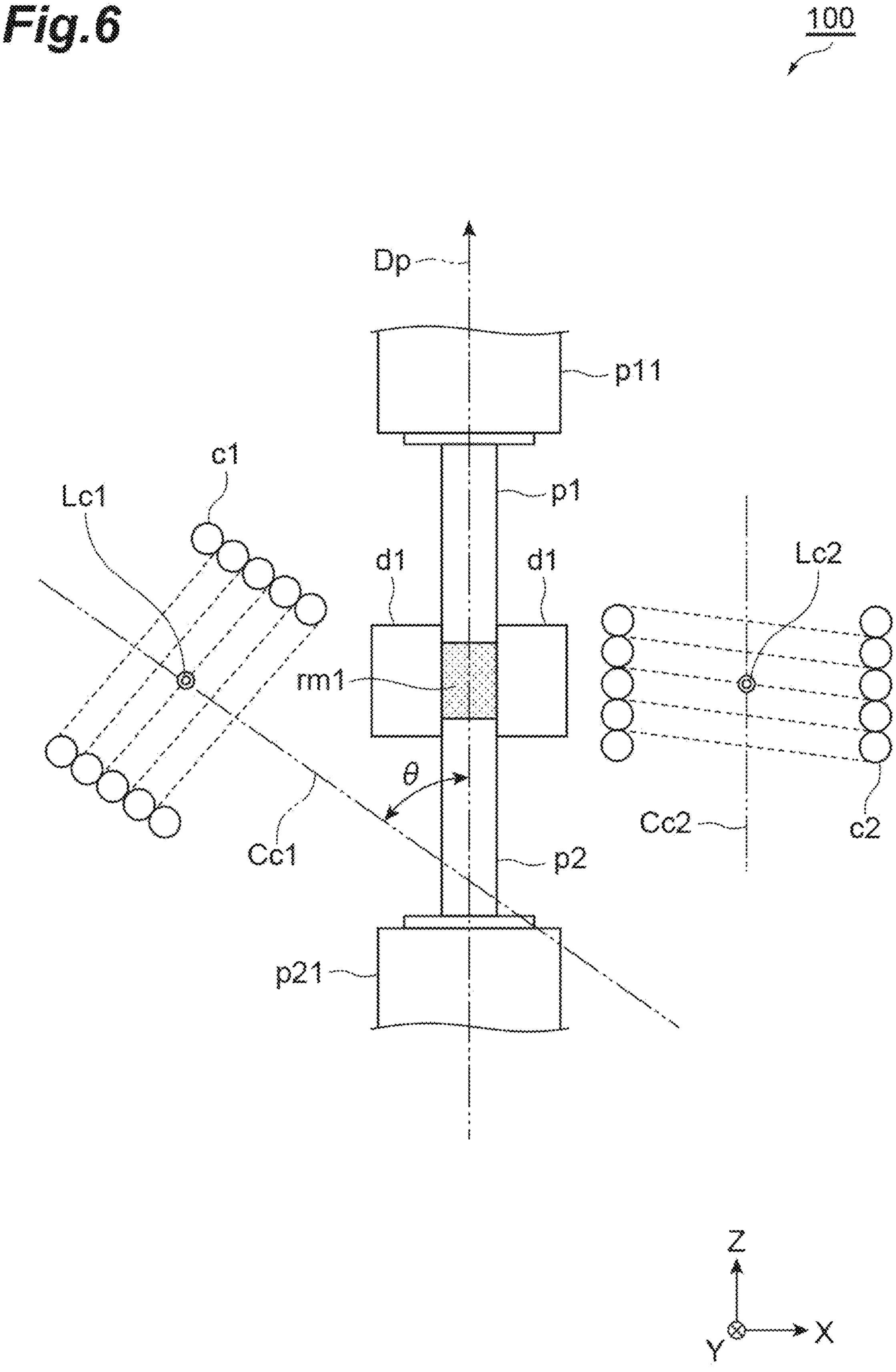
FIG. 6 shows a state where each of the pair of coils in the manufacturing apparatus shown in FIG. 1 is rotated individually.

FIG. 1 shows the direction (inclination) of each of the first coil c1 and the second coil c2 before each of the first coil c1 and the second coil c2 rotates. FIG. 6 shows one example of the direction (inclination) of each of the first coil c1 and the second coil c2 after each of the first coil c1 and the second coil c2 is rotated.

[Permanent Magnet Manufacturing Method Using Manufacturing Apparatus 100]

A magnetic field H is generated by at least one of the pair of coils (the first coil c1 and the second coil c2). The raw material rm1 in the die d1 is compressed by the pair of punches (the first punch p1 and the second punch p2) while the magnetic field H is applied to the raw material rm1 in the die d1. As a result, a compact is formed from the raw material rm1, and each magnetic particle (magnetic domain in each magnetic particle) in the compact is magnetized and oriented along the magnetic field H.

The magnetic field H may be synthesized from a magnetic field generated in the first coil c1 and a magnetic field generated in the second coil c2, and the synthesized magnetic field H may be applied to the raw material rm1 in the die d1. The magnetic field H generated by only one of the first coil c1 and the second coil c2 may be applied to the raw material rm1 in the die d1. The magnetic field H may be a static magnetic field (a magnetic field in which the distribution of magnetic flux does not change over time). The magnetic field H may be a pulsed magnetic field.

The direction of the magnetic field H applied to the raw material rm1 in the die d1 is freely changed by at least one operation selected from a group consisting of the movement of the entirety of the magnetic field generating mechanism M10, the rotation of the entirety of the magnetic field generating mechanism M10, and the rotation of at least one of the first coil c1 and the second coil c2. Namely, before the application of the magnetic field H to the raw material rm1 in the die d1 is started, the direction of the magnetic field H applied to the raw material rm1 in the die d1 is freely adjusted by any one of the above-described operations. Therefore, the magnetization direction and the orientation direction of each magnetic particle (magnetic domain in each magnetic particle) in the compact can be freely controlled. Since the magnetization direction and the orientation direction of each magnetic particle (magnetic domain in each magnetic particle) in the compact is maintained even in a finished permanent magnet, the magnetization direction of the permanent magnet can be easily changed and adjusted by controlling the magnetization direction and the orientation direction of each magnetic particle (magnetic domain in each magnetic particle) in the compact. In other words, according to the manufacturing apparatus 100, the magnetization direction of the permanent magnet can be easily changed and adjusted depending on the application, dimensions, and shape of the permanent magnet.

Hereinafter, specific examples of the magnetic field H applied to the raw material rm1 in the die d1 will be described with reference to FIGS. 7 to 11.

Figure 7:
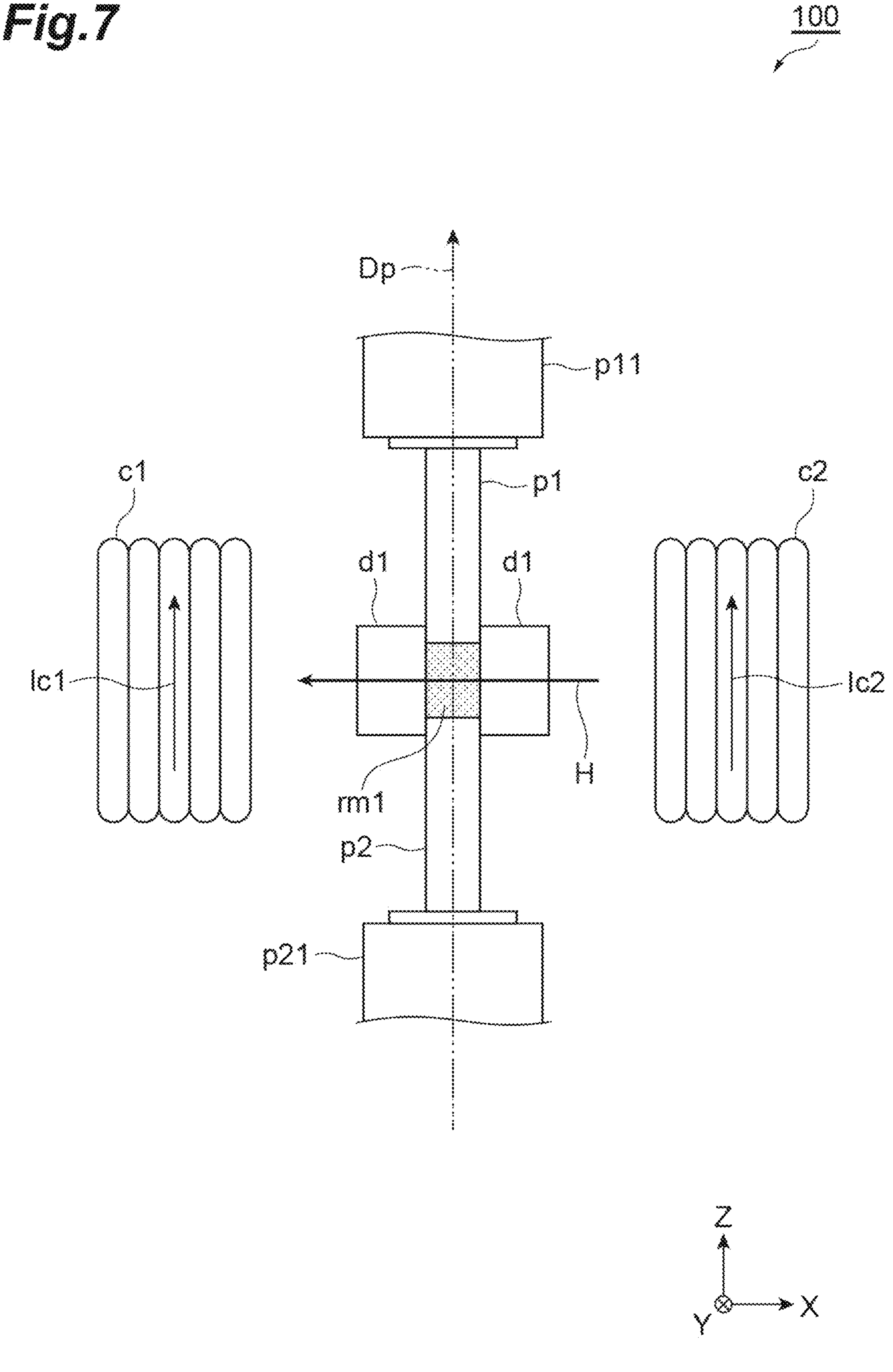
FIG. 7 shows one example of a magnetic field applied to a raw material by the pair of coils provided in the manufacturing apparatus shown in FIG. 1.

In the manufacturing apparatus 100 shown in FIG. 7, the raw material rm1 in the die d1 is disposed between the first coil c1 and the second coil c2. The first coil c1 and the second coil c2 face each other. The central axes of the first coil c1 and the second coil c2 coincide with each other, are perpendicular to the pressing direction Dp, and pass through the center of the raw material rm1. A direction of the first current Ic1 in the first coil c1 is the same as a direction of the second current Ic2 in the second coil c2. In the manufacturing apparatus 100 shown in FIG. 7, the magnetic flux density of the magnetic field H is its highest between the first coil c1 and the second coil c2, and the linear magnetic field H formed between the first coil c1 and the second coil c2 is applied to the raw material rm1. The magnetic field H applied to the raw material rm1 is perpendicular to the pressing direction Dp. Therefore, each magnetic particle (magnetic domain in each magnetic particle) in the compact is also magnetized and oriented in the direction perpendicular to the pressing direction Dp.

Figure 8:
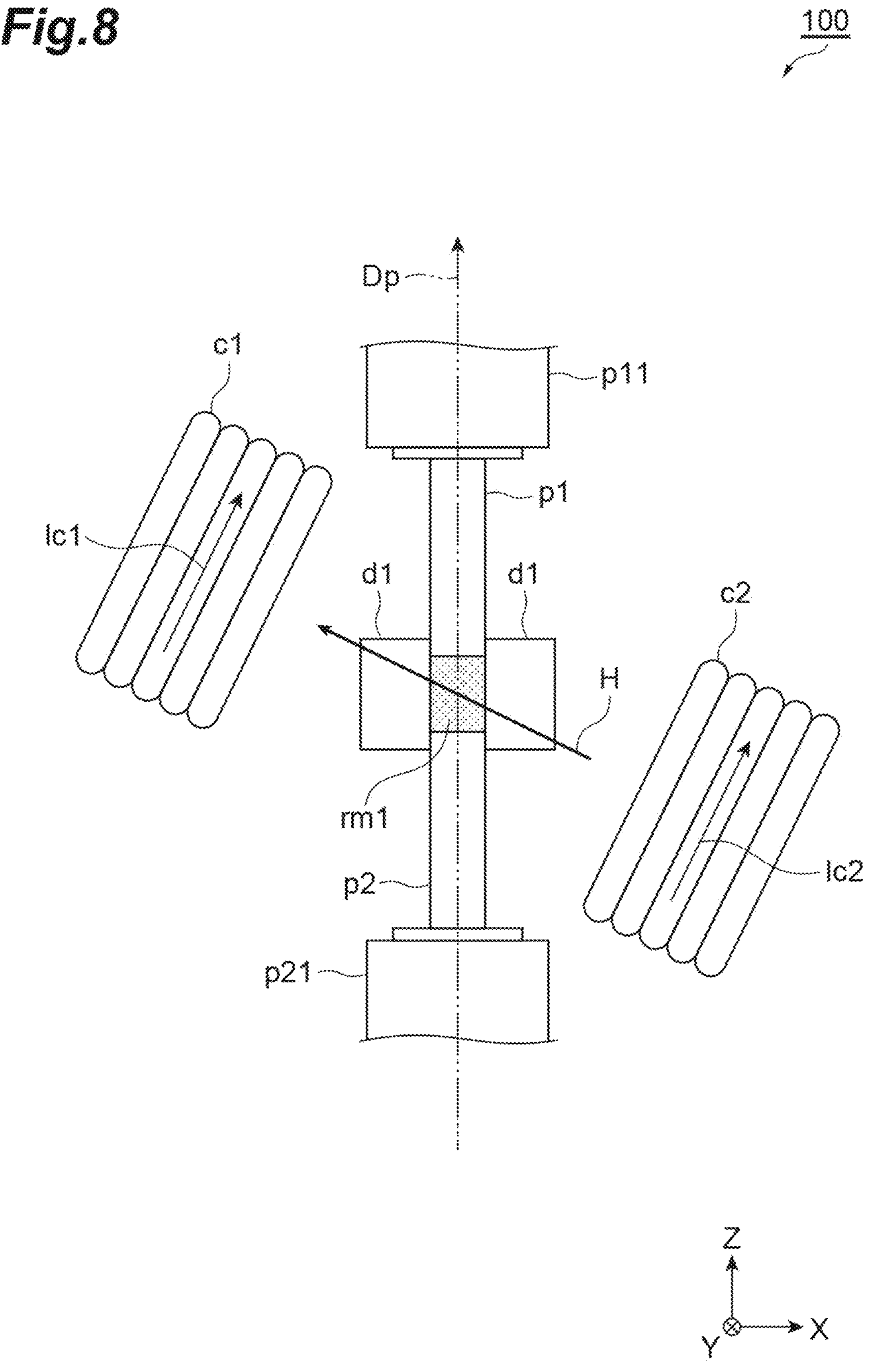
FIG. 8 shows one example of a magnetic field applied to the raw material by the pair of coils provided in the manufacturing apparatus shown in FIG. 1.

In the manufacturing apparatus 100 shown in FIG. 8, a state where the entirety of the magnetic field generating mechanism M10 is rotated is maintained. The raw material rm1 in the die d1 is disposed between the first coil c1 and the second coil c2. The first coil c1 and the second coil c2 face each other. The central axes of the first coil c1 and the second coil c2 coincide with each other, are inclined with respect to the pressing direction Dp, and pass through the center of the raw material rm1. A direction of the first current Ic1 in the first coil c1 is the same as a direction of the second current Ic2 in the second coil c2. In the manufacturing apparatus 100 shown in FIG. 8, the magnetic flux density of the magnetic field H is its highest between the first coil c1 and the second coil c2, and the linear magnetic field H formed between the first coil c1 and the second coil c2 is applied to the raw material rm1. The magnetic field H applied to the raw material rm1 is inclined with respect to the pressing direction Dp. Therefore, each magnetic particle (magnetic domain in each magnetic particle) in the compact is also magnetized and oriented in a direction inclined with respect to the pressing direction Dp.

Figure 9:
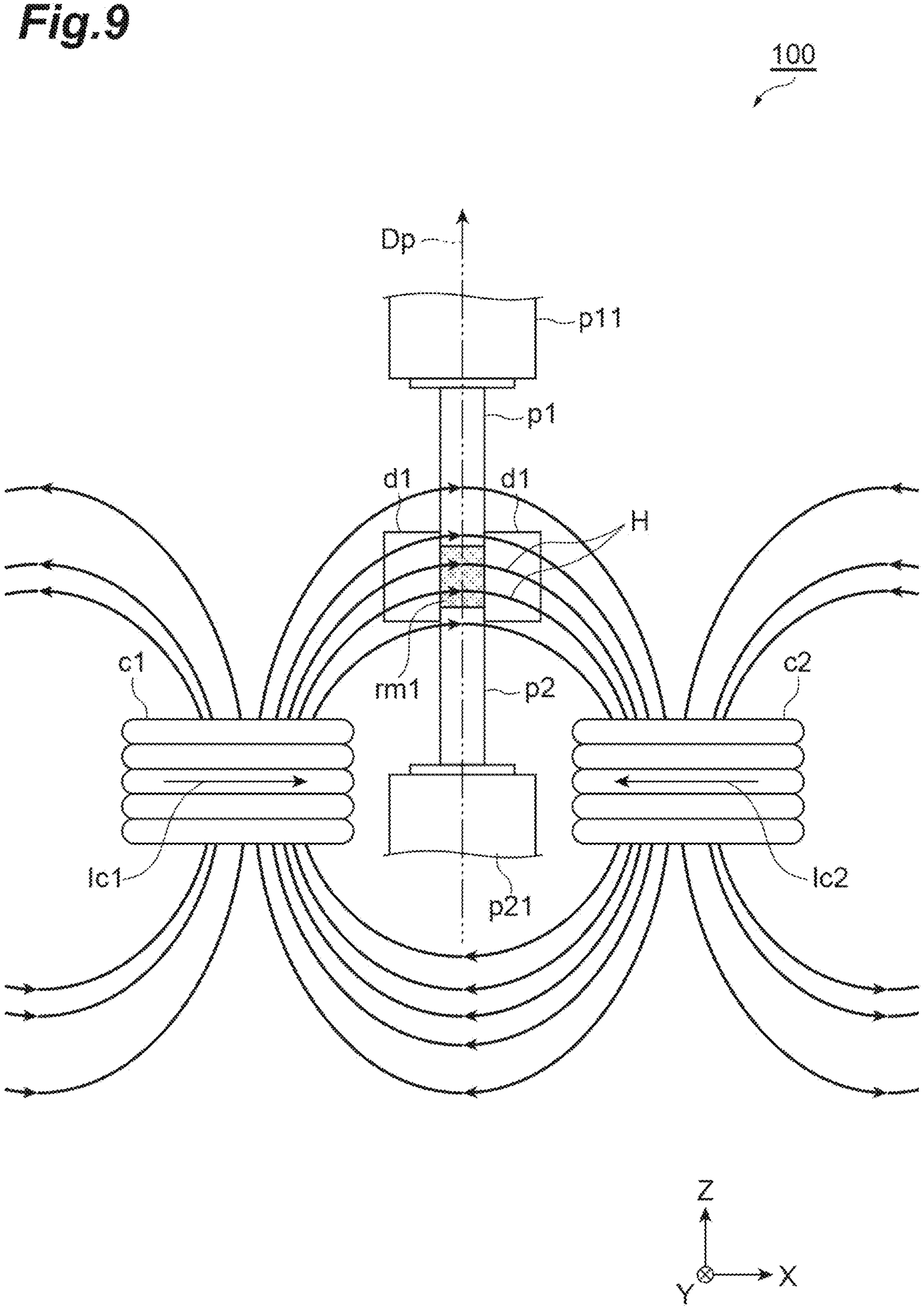
FIG. 9 shows one example of a magnetic field applied to the raw material by the pair of coils provided in the manufacturing apparatus shown in FIG. 1.

In the manufacturing apparatus 100 shown in FIG. 9, a state where the entirety of the magnetic field generating mechanism M10 moves in the direction parallel to the pressing direction Dp (downward direction) and each of the first coil c1 and the second coil c2 is rotated is maintained. The first coil c1 and the second coil c2 are disposed below the raw material rm1 in the die d1. The central axis of each of the first coil c1 and the second coil c2 is parallel to the pressing direction Dp. Namely, the angle between the central axis of each of the first coil c1 and the second coil c2 and the pressing direction Dp is 0 degrees. A direction of the first current Ic1 in the first coil c1 is the same as a direction of the second current Ic2 in the second coil c2. A curved magnetic flux extends from an upper end of the first coil c1 toward an upper end of the second coil c2. The density of the curved magnetic flux is relatively low at a portion where the raw material rm1 is disposed. Since the magnetic field H (magnetic flux) having a curved shape is applied to the raw material rm1, each magnetic particle (magnetic domain in each magnetic particle) in the compact is also magnetized and oriented along the same curve as the magnetic field H (magnetic flux).

Figure 10:
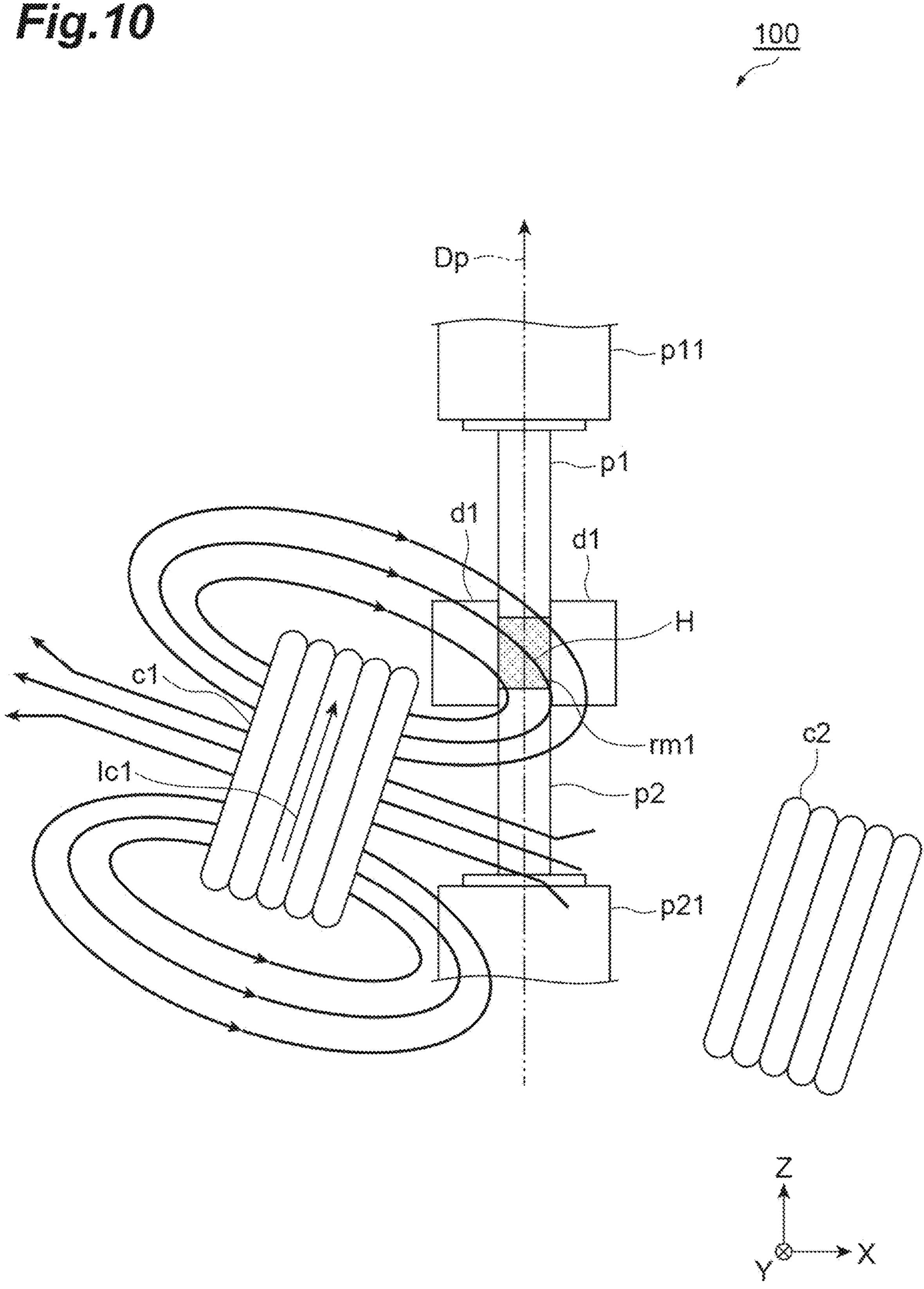
FIG. 10 shows one example of a magnetic field applied to the raw material by one coil provided in the manufacturing apparatus shown in FIG. 1.

In the manufacturing apparatus 100 shown in FIG. 10, a state where the entirety of the magnetic field generating mechanism M10 moves in the direction parallel to the pressing direction Dp (downward direction) and the direction perpendicular to the pressing direction Dp (rightward direction) and the entirety of the magnetic field generating mechanism M10 is rotated is maintained. The first coil c1 and the second coil c2 are disposed below the raw material rm1 in the die d1. The first current Ic1 is generated in the first coil c1, but the second current Ic2 is not generated in the second coil c2. Therefore, the magnetic field H is generated only by the first coil c1. The magnetic field H which is located outside the first coil c1, in which the magnetic flux is curved, and which has a relatively low density of magnetic flux is applied to the raw material rm1. Since the magnetic field H (magnetic flux) having a curved shape is applied to the raw material rm1, each magnetic particle (magnetic domain in each magnetic particle) in the compact is also magnetized and oriented along the same curve as the magnetic field H (magnetic flux). Since the magnetic field H applied to the raw material rm1 is inclined with respect to the pressing direction Dp, each magnetic particle (magnetic domain in each magnetic particle) in the compact is also magnetized and oriented in a direction inclined with respect to the pressing direction Dp.

Figure 11:
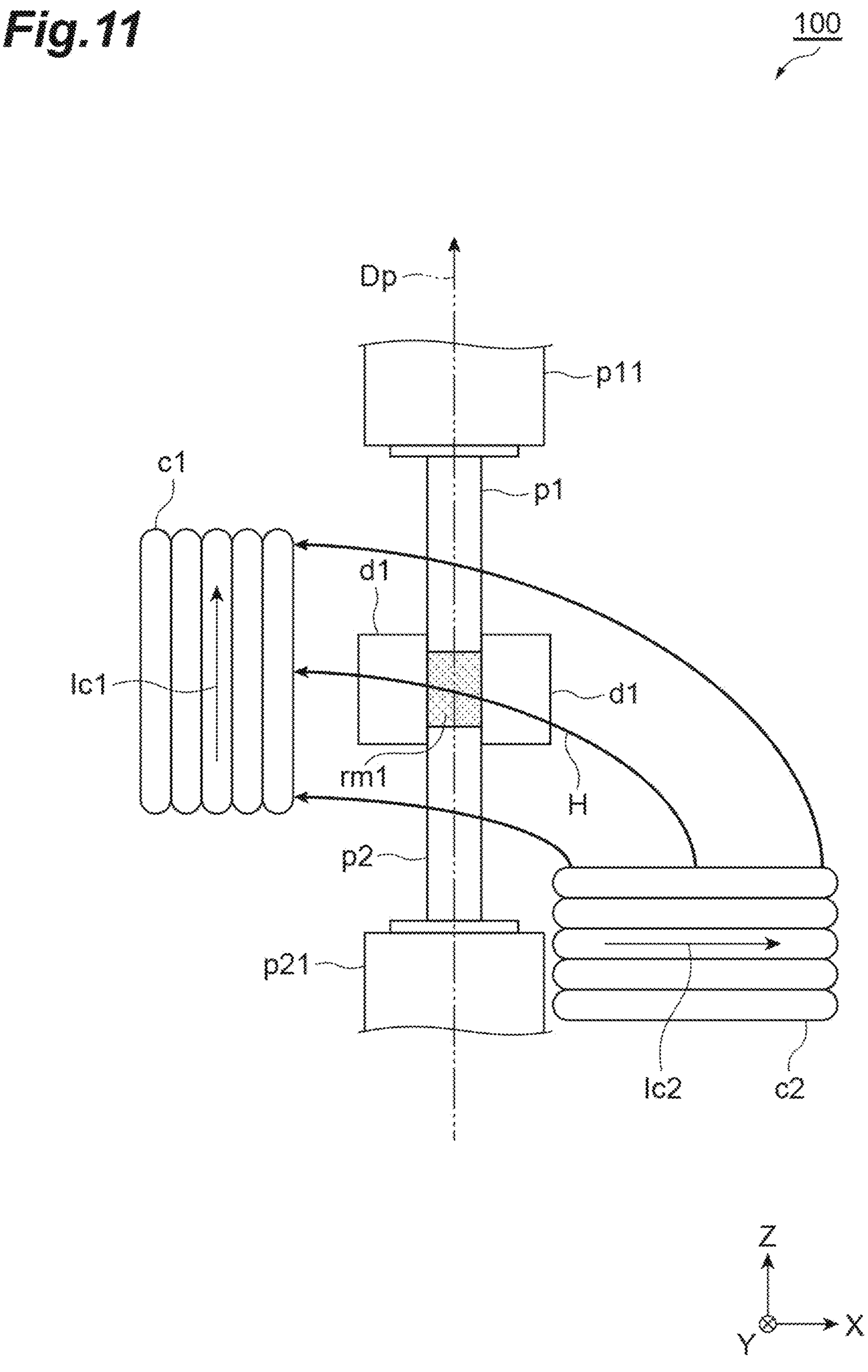
FIG. 11 shows one example of a magnetic field applied to the raw material by the pair of coils provided in the manufacturing apparatus shown in FIG. 1.

In the manufacturing apparatus 100 shown in FIG. 11, a state where the entirety of the magnetic field generating mechanism M10 rotates and each of the first coil c1 and the second coil c2 is rotated is maintained. The first coil c1 is disposed to the left of the die d1, and the second coil c2 is disposed below the die d1. The central axis of the first coil c1 is perpendicular to the pressing direction Dp. Namely, the angle between the central axis of the first coil c1 and the pressing direction Dp is 90 degrees. The central axis of the second coil c2 is parallel to the pressing direction Dp. Namely, the angle between the central axis of the second coil c2 and the pressing direction Dp is 0 degrees. In the magnetic field H generated by the first coil c1 and the second coil c2, a curved magnetic flux extends from the upper end of the second coil c2 toward a right end of the first coil c1. Since the magnetic field H (magnetic flux) having a curved shape is applied to the raw material rm1, each magnetic particle (magnetic domain in each magnetic particle) in the compact is also magnetized and oriented along the same curve as the magnetic field H (magnetic flux). Since the magnetic field H applied to the raw material rm1 is inclined with respect to the pressing direction Dp, each magnetic particle (magnetic domain in each magnetic particle) in the compact is also magnetized and oriented in a direction inclined with respect to the pressing direction Dp.

The direction of the magnetic field H applied to the raw material rm1 in the die d1 is not limited to the directions of the magnetic field H shown in FIGS. 7 to 11. By changing the disposition and the direction of each of the first coil c1 and the second coil c2 through the above-described operations, the direction and the intensity of the magnetic field H applied to the raw material rm1 in the die d1 can be freely changed and adjusted. By changing the direction and the absolute value of the first current Ic1 in the first coil c1 and the direction and the absolute value of the second current Ic2 in the second coil c2, the direction and the intensity of the magnetic field H applied to the raw material rm1 in the die d1 can also be freely changed and adjusted. The direction and the intensity of the magnetic field H (the direction and the density of magnetic flux) can be easily calculated by a simulation using commercially available software.

The magnetic powder contained in the raw material rm1 may be, for example, a Nd—Fe—B-based magnet (an alloy such as $Nd_2Fe_{14}B$), a samarium-iron-nitrogen-based magnet (an alloy such as $Sm_2Fe_{17}N_3$), a samarium-cobalt-based magnet (an alloy such as $Sm_2Co_{17}$), a praseodymium-based magnet (an alloy such as $PrCo_5$), or a ferrite magnet. For example, the Nd—Fe—B-based magnet is used as the raw material for both a bonded magnet and a sintered magnet. Meanwhile, since the crystal structure of a Sm—Fe—N-based magnet is likely to deteriorate at high temperature (approximately 500° C.), it is difficult to manufacture a sintered magnet from the Sm—Fe—N-based magnet. Therefore, the Sm—Fe—N-based magnet is used as the raw material for a bonded magnet that can be manufactured by heating (thermal curing of a thermosetting resin mixed with magnet powder) at low temperature at which the crystal structure is maintained.

When a bonded magnet is manufactured as a permanent magnet, the raw material rm1 may contain components such as a thermosetting resin, a curing agent, a curing accelerator (curing catalyst), a silane coupling agent, and wax (lubricant), a flame retardant, and an organic solvent, in addition to magnet powder. The raw material rm1 for the bonded magnet may further contain a thermoplastic resin in addition to the thermosetting resin. When a sintered magnet is manufactured as a permanent magnet, the raw material rm1 may contain a component such as wax (lubricant) in addition to magnet powder. The raw material rm1 is approximately uniformly mixed in advance.

In a bonded magnet manufacturing method, after a compact is formed using the above-described method, the compact is demagnetized by applying a magnetic field (reverse magnetic field), which faces a direction opposite to the magnetic field H, to the compact. Even in the demagnetized compact, a state where an easy magnetization axis of each magnetic particle in the compact is oriented in the same direction as the magnetic field H is maintained. The compact may be demagnetized using the manufacturing apparatus 100. Namely, the compact may be demagnetized by applying a magnetic field (reverse magnetic field), which faces the direction opposite to the magnetic field H, to the compact clamped in the die d1 between the first punch p1 and the second punch p2. After the compact is removed from the die d1, the compact may be demagnetized using an apparatus separate from the manufacturing apparatus 100. In the bonded magnet manufacturing method, a cured product of the compact may be formed by heating the demagnetized compact. Namely, a cured product of the compact may be formed by thermal curing of the thermosetting resin in the compact. In the bonded magnet manufacturing method, the cured product of the compact is magnetized by applying a magnetic field, which faces the same direction as the magnetic field H, to the cured product of the compact. A permanent magnet (anisotropic magnet magnetized in a specific direction) is obtained by magnetization of the cured product of the compact. The dimensions and shape of the permanent magnet may be adjusted by cutting the permanent magnet.

In a sintered magnet manufacturing method, a compact formed using the above-described method is sintered to form a sintered body. The sintered body may be used as a permanent magnet (anisotropic magnet magnetized in a specific direction). Before the compact is sintered, the compact may be degreased by heating the compact at a temperature lower than a sintering temperature of the compact. The sintered body may be magnetized by applying a magnetic field, which faces the same direction as the magnetic field H, to the sintered body. The magnetized sintered body may be used as a permanent magnet. The dimensions and shape of the permanent magnet may be adjusted by cutting the permanent magnet.

Second Embodiment

Figure 12:
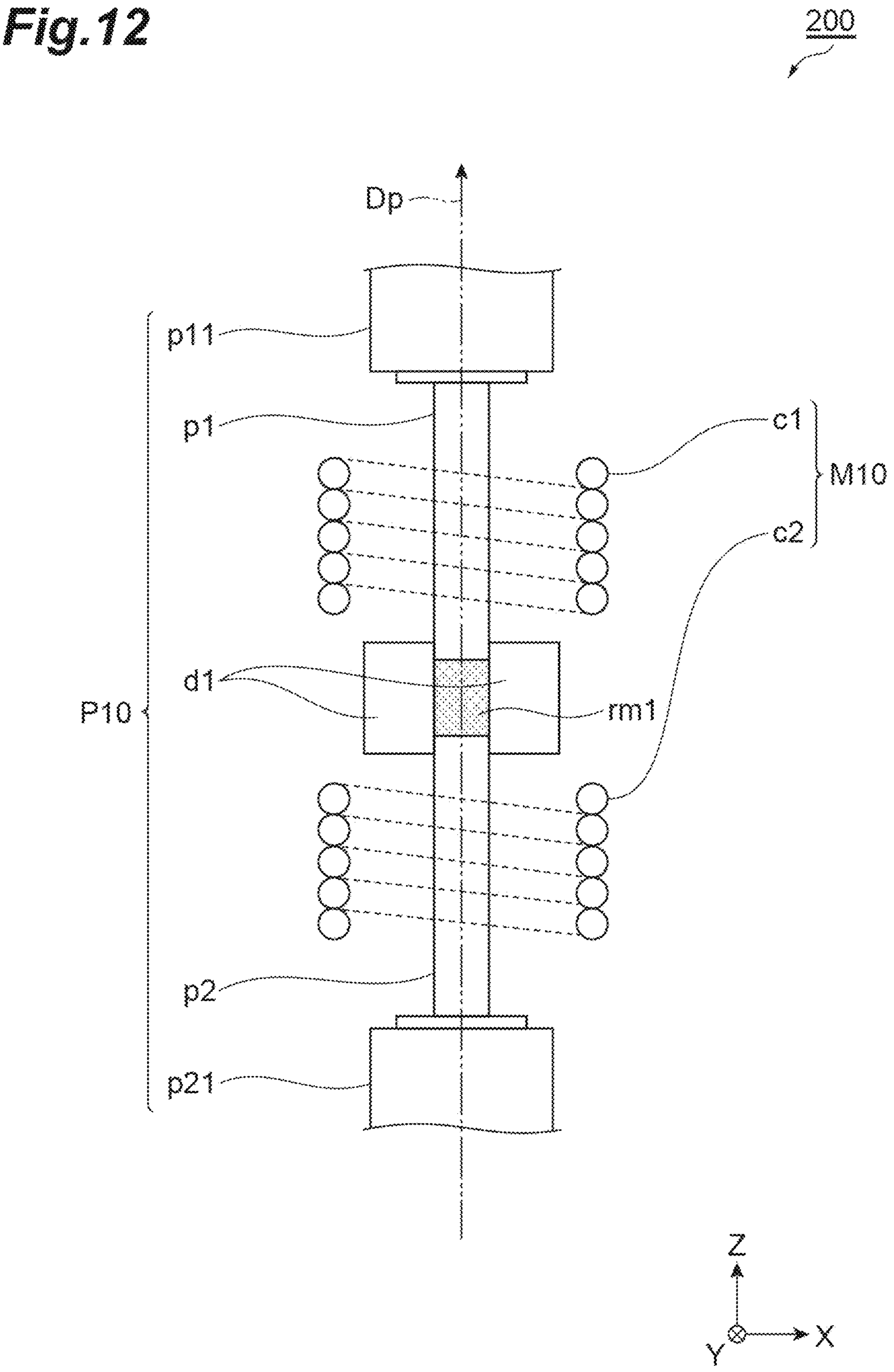
FIG. 12 is a schematic cross-sectional view of a manufacturing apparatus according to a second embodiment of the present invention, and a cross section shown in FIG. 12 is parallel to the pressing direction, and traverses all of a pair of punches, a die, and a pair of coils.
Figure 13:
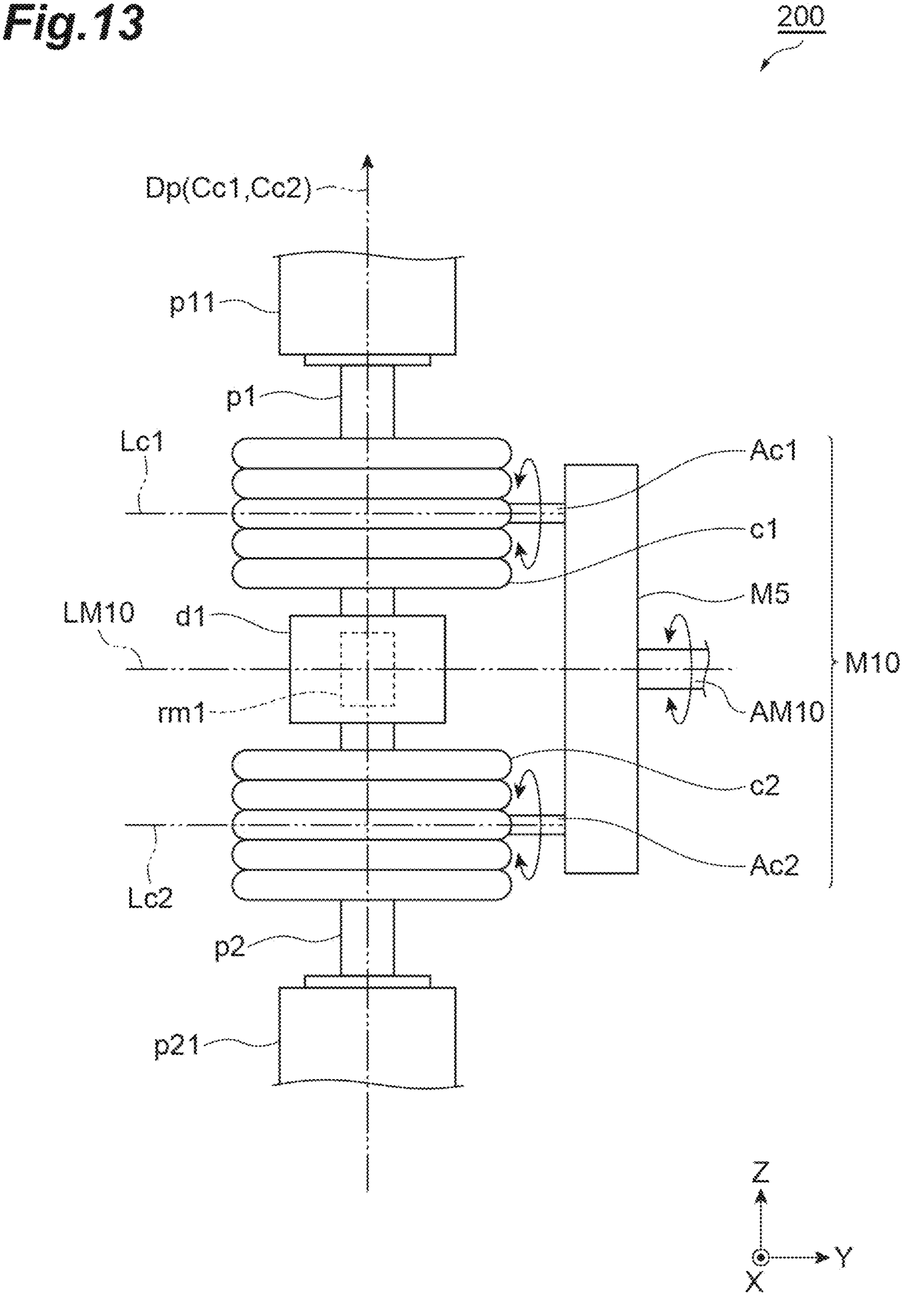
FIG. 13 is a schematic side view of the manufacturing apparatus shown in FIG. 12.
Figure 14:
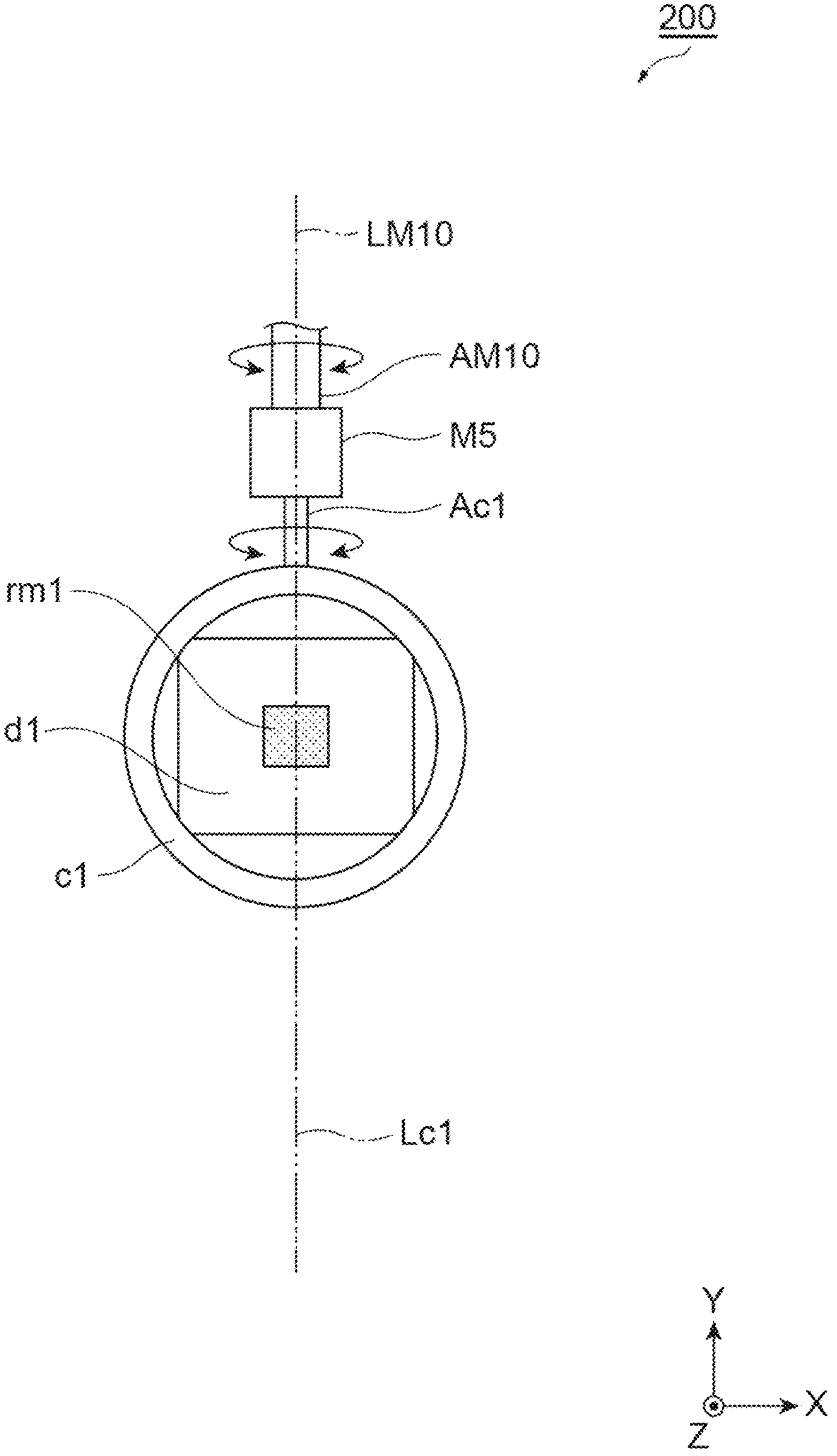
FIG. 14 is a schematic top view of the manufacturing apparatus shown in FIG. 12, and portions of a compression molding mechanism other than the die are omitted in FIG. 14.
Figure 15:
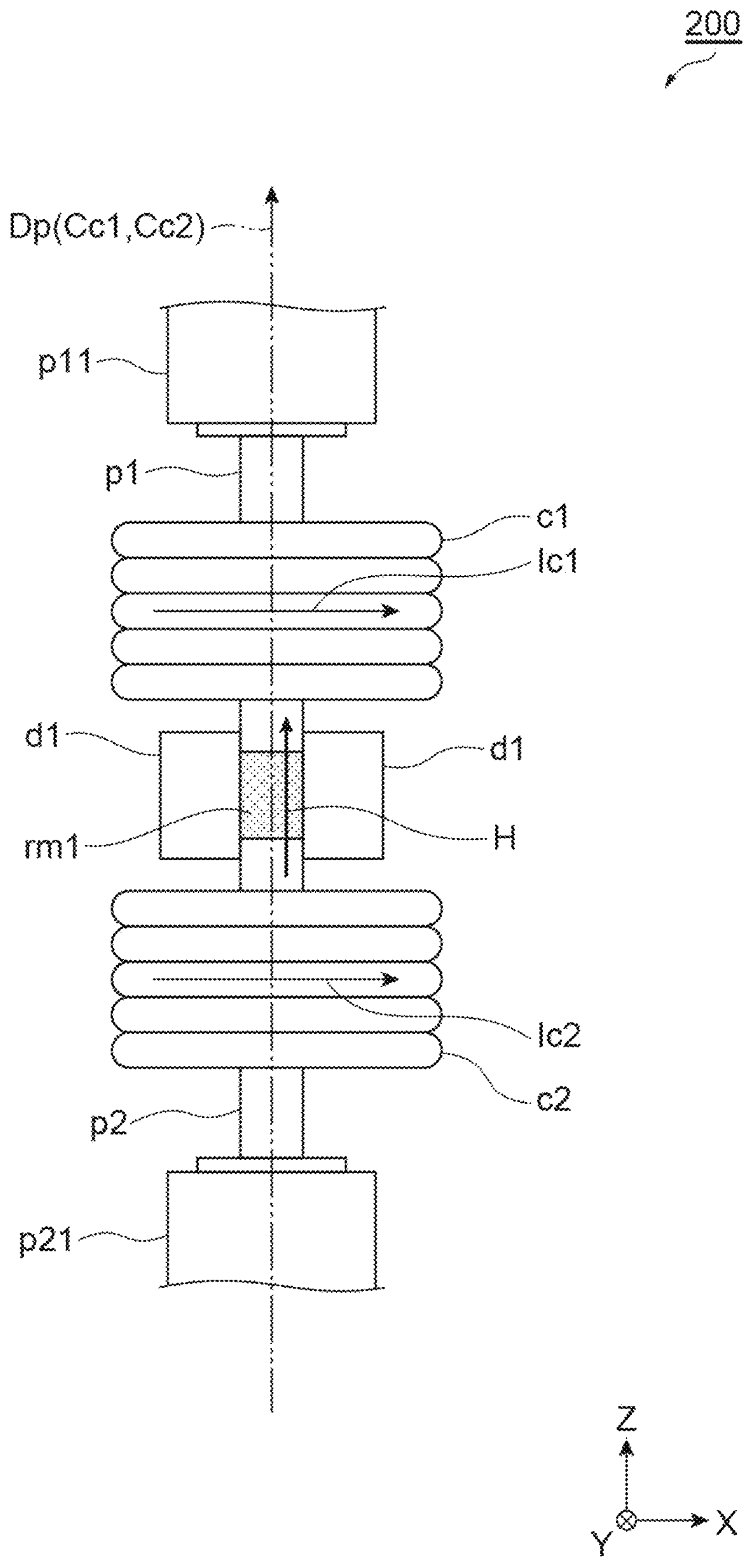
FIG. 15 shows one example of a magnetic field applied to a raw material by the pair of coils provided in the manufacturing apparatus shown in FIG. 12.
Figure 16:
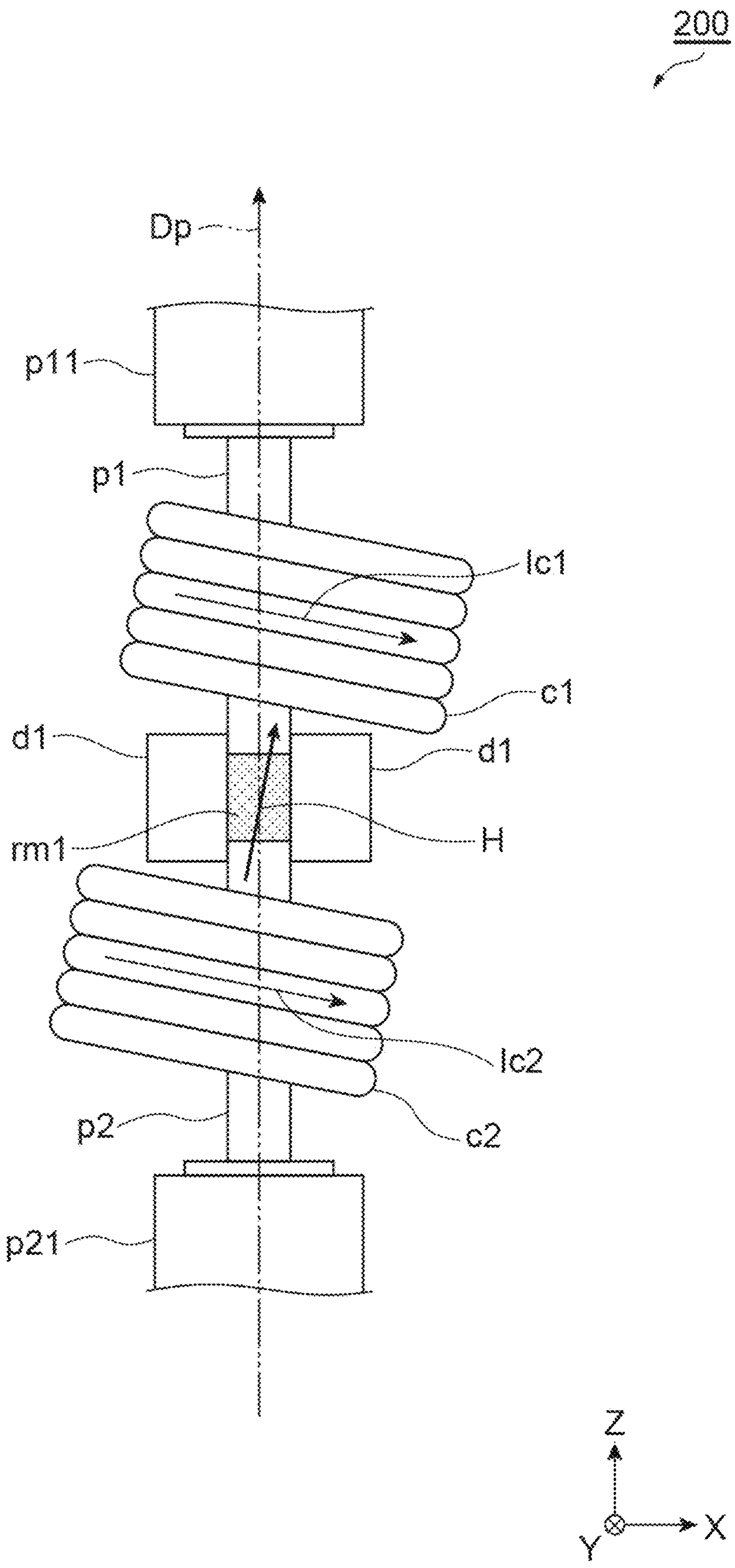
FIG. 16 shows one example of a magnetic field applied to the raw material by the pair of coils provided in the manufacturing apparatus shown in FIG. 12.

FIGS. 12 to 16 show a permanent magnet manufacturing apparatus 200 according to a second embodiment of the present invention. FIG. 12 shows a cross section of the manufacturing apparatus 200. The cross section shown in FIG. 12 is parallel to the front of the manufacturing apparatus 200. FIG. 13 shows the side of the manufacturing apparatus 200 shown in FIG. 12. FIG. 14 shows the top of the manufacturing apparatus 200 shown in FIG. 12. Each of FIGS. 15 and 16 shows the front of the manufacturing apparatus 200. For convenience of description, in FIGS. 15 and 16 (each front view), a cross section of the raw material rm1 containing magnet powder and a cross section of the die d1 having a tubular shape are shown.

Hereinafter, differences between the second embodiment and the first embodiment will be mainly described.

In the permanent magnet manufacturing apparatus 200, at least a part of the compression molding mechanism P10 is disposed inside each of the pair of coils (the first coil c1 and the second coil c2). In other words, at least a part of the compression molding mechanism P10 penetrates through the inside of each of the pair of coils. For example, as shown in FIG. 12, the first punch p1 penetrates through the inside of the first coil c1, and the second punch p2 penetrates through the inside of the second coil c2. In the manufacturing apparatus 200, the entirety of the compression molding mechanism P10 may be disposed inside each of the pair of coils (the first coil c1 and the second coil c2).

The range where the entirety of the magnetic field generating mechanism M10 moves is limited to a range where the compression molding mechanisms P10 disposed inside each of the pair of coils does not physically interfere with the magnetic field generating mechanism M10.

The range where the entirety of the magnetic field generating mechanism M10 rotates is limited to a range where the compression molding mechanisms P10 disposed inside each of the pair of coils does not physically interfere with the magnetic field generating mechanism M10.

The range where the first coil c1 rotates is limited to a range where the compression molding mechanism P10 disposed inside the first coil c1 does not physically interfere with the first coil c1.

The range where the second coil c2 rotates is limited to a range where the compression molding mechanism P10 disposed inside the second coil c2 does not physically interfere with the second coil c2.

Except for the above-described points, the manufacturing apparatus 200 according to the second embodiment is the same as the manufacturing apparatus 100 according to the first embodiment. Except for the above-described points, a permanent magnet manufacturing method using the manufacturing apparatus 200 is the same as the permanent magnet manufacturing method using the manufacturing apparatus 100.

In the manufacturing apparatus 200 as well, the direction of the magnetic field H applied to the raw material rm1 in the die d1 is freely changed by at least one operation selected from a group consisting of the movement of the entirety of the magnetic field generating mechanism M10, the rotation of the entirety of the magnetic field generating mechanism M10, and the rotation of at least one of the first coil c1 and the second coil c2. Namely, before the application of the magnetic field H to the raw material rm1 in the die d1 is started, the direction of the magnetic field H applied to the raw material rm1 in the die d1 is freely adjusted by any one of the above-described operations. Therefore, the magnetization direction and the orientation direction of each magnetic particle (magnetic domain in each magnetic particle) in the compact can be freely controlled. Since the magnetization direction and the orientation direction of each magnetic particle (magnetic domain in each magnetic particle) in the compact is maintained even in a finished permanent magnet, the magnetization direction of the permanent magnet can be easily changed and adjusted by controlling the magnetization direction and the orientation direction of each magnetic particle (magnetic domain in each magnetic particle) in the compact. In other words, according to the manufacturing apparatus 200, the magnetization direction of the permanent magnet can be easily changed and adjusted depending on the application, dimensions, and shape of the permanent magnet.

For example, in the manufacturing apparatus 200 shown in FIG. 15, the raw material rm1 in the die d1 is disposed between the first coil c1 and the second coil c2. The first coil c1 and the second coil c2 face each other. The central axes of the first coil c1 and the second coil c2 coincide with each other, are parallel to the pressing direction Dp, and pass through the center of the raw material rm1. A direction of the first current Ic1 in the first coil c1 is the same as a direction of the second current Ic2 in the second coil c2. In the manufacturing apparatus 100 shown in FIG. 15, the magnetic flux density of the magnetic field H is its highest between the first coil c1 and the second coil c2, and the linear magnetic field H formed between the first coil c1 and the second coil c2 is applied to the raw material rm1. The magnetic field H applied to the raw material rm1 is parallel to the pressing direction Dp. Therefore, each magnetic particle (magnetic domain in each magnetic particle) in the compact is also magnetized and oriented in a direction parallel to the pressing direction Dp.

In the manufacturing apparatus 200 shown in FIG. 16, a state where the entirety of the magnetic field generating mechanism M10 is rotated is maintained. The raw material rm1 in the die d1 is disposed between the first coil c1 and the second coil c2. The first coil c1 and the second coil c2 face each other. The central axes of the first coil c1 and the second coil c2 coincide with each other, are inclined with respect to the pressing direction Dp, and pass through the center of the raw material rm1. A direction of the first current Ic1 in the first coil c1 is the same as a direction of the second current Ic2 in the second coil c2. In the manufacturing apparatus 200 shown in FIG. 16, the magnetic flux density of the magnetic field H is its highest between the first coil c1 and the second coil c2, and the linear magnetic field H formed between the first coil c1 and the second coil c2 is applied to the raw material rm1. The magnetic field H applied to the raw material rm1 is inclined with respect to the pressing direction Dp. Therefore, each magnetic particle (magnetic domain in each magnetic particle) in the compact is also magnetized and oriented in a direction inclined with respect to the pressing direction Dp.

The direction of the magnetic field H applied to the raw material rm1 in the die d1 is not limited to the direction of each magnetic field H shown in FIGS. 15 and 16.

The present invention is not necessarily limited to the above-described embodiments. The present invention can be modified in various forms without departing from the concept of the present invention, and the modification examples are also included in the present invention.

For example, the manufacturing apparatus 100 and the manufacturing apparatus 200 may further include a heating mechanism (heater) that heats the raw material rm1 in the die d1 or the compact.

INDUSTRIAL APPLICABILITY

For example, the permanent magnet manufacturing apparatus according to one aspect of the present invention is used for manufacturing a bonded magnet or a sintered magnet.

REFERENCE SIGNS LIST 100, 200: permanent magnet manufacturing apparatus, P10: compression molding mechanism, M10: magnetic field generating mechanism, LM10: rotation axis of entirety of the magnetic field generating mechanism M10, AM10: third rotation mechanism (rotation mechanism of the magnetic field generating mechanism M10), p1: first punch, p11: first pressing mechanism (pressing mechanism for the first punch p1), p2: second punch, p21: second pressing mechanism (pressing mechanism for the second punch p2), Dp: pressing direction, d1: die, c1: first coil, Cc1: central axis of the first coil c1, Lc1: rotation axis of the first coil c1, Ac1: first rotation mechanism (rotation mechanism for the first coil c1), Ic1: first current in the first coil c1 and direction of first current, c2: second coil, Cc2: central axis of the second coil c2, Lc2: rotation axis of the second coil c2, Ac2: second rotation mechanism (rotation mechanism for the second coil c2), Ic2: second current in the second coil c2 and direction of the second current, M5: coupling member, rm1: raw material containing magnet powder, H: magnetic field applied to the raw material rm1 and direction of magnetic field, θ: angle between central axis of coil and the pressing direction Dp (angle between the central axis Cc1 of the first coil c1 and the pressing direction Dp).

The invention claimed is:

1. A permanent magnet manufacturing apparatus comprising:

a compression molding mechanism; and a magnetic field generating mechanism, wherein the compression molding mechanism includes a pair of punches facing each other, and a die having a tubular shape into which the pair of punches are inserted, the magnetic field generating mechanism includes a pair of coils, the compression molding mechanism is disposed between the pair of coils, the compression molding mechanism does not penetrate through an inside of each of the pair of coils, the die includes a space between the pair of punches into which a raw material containing magnet powder is capable of being supplied, a magnetic field is generated by at least one of the pair of coils, the pair of punches is configured to compress raw material in the die while applying the magnetic field to the raw material in the die in order to form a compact from the raw material, the apparatus includes means for changing a direction of the magnetic field applied to raw material in the die by at least one of a movement of an entirety of the magnetic field generating mechanism, a rotation of the entirety of the magnetic field generating mechanism and a rotation of at least one of the coils, a pressing direction is defined as a direction in which the pair of punches face each other, a distance from a rotation axis of the entirety of the magnetic field generating mechanism to one coil is equal to a distance from the rotation axis to the other coil, the rotation axis is perpendicular to the pressing direction, and the entirety of the magnetic field generating mechanism is configured to rotate about the rotation axis.

2. A permanent magnet manufacturing apparatus comprising:

a compression molding mechanism; and a magnetic field generating mechanism, wherein the compression molding mechanism includes a pair of punches facing each other, and a die having a tubular shape into which the pair of punches are inserted, the magnetic field generating mechanism includes a pair of coils, the compression molding mechanism is disposed between the pair of coils, the compression molding mechanism does not penetrate through an inside of each of the pair of coils, the die includes a space between the pair of punches into which a raw material containing magnet powder is capable of being supplied, a magnetic field is generated by at least one of the pair of coils, the pair of punches is configured to compress raw material in the die while applying the magnetic field to the raw material in the die in order to form a compact from the raw material, the apparatus includes means for changing a direction of the magnetic field applied to raw material in the die by at least one of a movement of an entirety of the magnetic field generating mechanism, a rotation of the entirety of the magnetic field generating mechanism and a rotation of at least one of the coils, a pressing direction is defined as a direction in which the pair of punches face each other, and at least one of the coils is configured to rotate such that an angle between a central axis of the one coil and the pressing direction is changed.

* * * * *